United States Patent
Martinka et al.

(10) Patent No.: US 6,591,257 B1
(45) Date of Patent: Jul. 8, 2003

(54) APPARATUS AND METHOD FOR A COMPOSITIONAL DECISION SUPPORT REASONING SYSTEM

(75) Inventors: Joseph J Martinka, Sunnyvale, CA (US); Patricia Collins, Mountain View, CA (US); George H. Forman, Port Orchard, WA (US); Evan R. Kirshenbaum, Mountain View, CA (US); Aparna Seetharaman, Palo Alto, CA (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/472,389

(22) Filed: Dec. 23, 1999

(51) Int. Cl.[7] .................................................. G06N 5/02
(52) U.S. Cl. ....................................................... 706/46
(58) Field of Search ................................ 706/45, 46, 59

(56) References Cited

U.S. PATENT DOCUMENTS 5,797,135 A * 8/1998 Whalen et al. ................ 706/45

OTHER PUBLICATIONS

Brian R. Gaines; Transforming Rules and Trees into Comprehensible Knowledge Structures; 1996; University of Calgary; EDAG94; 1–16.*
U.S. patent application of Joseph Martinka, et al. entitled Apparatus For A Multi–Modal Ontology Engine, Ser. No. unknown, filed on the same date as the present application.
The Knowledge Engineering Review, vol. 13:1, 1998, 5–29, Knowledge Level Modelling: Concepts and Terminology of Mike Uschold.
AdvantageKBS from Logica Corporation web sites http://www.akbs.com and http://www.logica.com.
The Knowledge Engineering Review, vol. 13:3, 1998, 225–246, A Tutorial on Default Reasoning of Grigoris Antoniou.
Knowledge Science Institute, University of Calgary, Structured and Unstructured Induction with EDAGs of Brian R. Gaines.
IEEE Transactions on Knowledge and Data Engineering, vol. 11, No. 1, Jan./Feb. 1999 Rule–Induction and Case–Based Reasoning: Hybrid Architectures Appear Advantageous of Cercone, et al.
ServiceWare, Inc. website at http://www.serviceware.com/kpns/main.asp.

* cited by examiner

*Primary Examiner*—John Follansbee
*Assistant Examiner*—Joseph P. Hirl

(57) ABSTRACT

An apparatus and method for determining a solution to a problem where paths in at least one pursuit associated with the problem are traversed to generate one or more decision paths by processing one or more nodes in a given one of the paths, including: evaluating a premise if the node is a premise node, and passing the premise node if the premise passes, and noting a conclusion if the node is a conclusion node, withdrawing any previous conclusions that are not associated with a parent node of the conclusion, and passing the conclusion node; processing a child node if the current node is not a leaf node and is a node that passes; terminating a decision path if the child node cannot be processed, including asserting all noted, but non-withdrawn conclusions as a solution to the problem; and generating another decision path.

21 Claims, 10 Drawing Sheets

APPARATUS AND METHOD FOR A COMPOSITIONAL DECISION SUPPORT REASONING SYSTEM

FIELD OF THE INVENTION

This invention pertains to the field of artificial intelligence, and more particularly, to an apparatus and method for a compositional decision support reasoning system for generating incremental and multiple conclusions.

BACKGROUND OF THE INVENTION

This invention is related to the copending U.S. Application of Joseph Martinka, et. al. entitled "APPARATUS FOR A MULTI-MODAL ONTOLOGY ENGINE", Ser. No. 09/470,848 filed on the same date as the present application, and hereby incorporates by reference all that is disclosed therein.

An organization's most valuable asset is its knowledge. More and more companies are embracing knowledge-based system technology as a means of putting the right knowledge in the hands of the right people at the right time. Intelligent electronic manuals, internal help desks, customer support hotlines, call avoidance troubleshooting software, pre-sales assessment, configuration guides, and proactive system management are some of the ways that the emerging field of computer aided decision support allows people to perform critical tasks and make key decisions with the skill of the leading experts, but without the labor costs of employing experts in delivering the support services.

All of these computer-assisted solutions entail the employment of a decision support system, or a system that employs a knowledge representation paradigm to determine a solution to a problem. A knowledge representation paradigm comprises two components: a knowledge representation fact base and a reasoning system. A knowledge representation fact base is the means by which an expert's knowledge is encoded to form a knowledge base, or a repository of information needed to solve a problem. A knowledge representation fact base can be thought of as comprising a number of related components called knowledge objects, where each object exists in a specific relationship to other objects in the knowledge representation fact base. Objects in a knowledge representation fact base represent the different components into which actual facts in the real world can be remembered and used. The specific terminology and definitions used in a given knowledge representation fact base are referred to as the knowledge representation paradigm's ontology: the terms knowledge representation fact base and ontology are often used interchangeably.

A reasoning system is the logic underlying a decision support system. A reasoning system of a decision support system is the logic component of the decision support system, as opposed to the knowledge repository component. A reasoning system is the mechanism that uses a knowledge representation model to make inferences about objects in the knowledge representation fact base. During a decision support session, a knowledge representation paradigm is employed to find a solution to a problem. A reasoning system of the knowledge representation paradigm invokes an algorithm using its knowledge representation model to operate on knowledge in the system's knowledge representation fact base. A knowledge representation model can be a tree, or a graph, for example. Oftentimes, the terms knowledge representation paradigm and reasoning system are used synonymously. In large part, this is because in current systems, a knowledge representation fact base is inseparably part of a corresponding reasoning system: a knowledge representation fact base has semantics that are usually closely tied to a reasoning system algorithm.

Examples of existing knowledge representation paradigms include basic text, decision trees, decision graphs, case-bases, default logic, augmented fault, and Bayesian belief networks. In a decision tree knowledge representation paradigm, for example, the knowledge representation fact base is composed of a number of question and answer knowledge objects, wherein knowledge is encoded into a knowledge base in the form of question and answer tests. The reasoning system of the decision tree knowledge representation paradigm comprises an algorithm of IF-THEN-ELSE statements that operate on the knowledge objects to create a tree model. The tree model encapsulates a series of decision flows that can be made using the question and answer objects in a decision support session. The logic of the IF-THEN-ELSE statements then dictate the relationship between these objects. Just as there are many different programming languages, each best suited for certain types of projects (e.g., FORTRAN for number crunching, Visual Basic for GUI development, C++ for object-oriented solutions), there are also many different ways for representing knowledge, some more appropriate for a given problem domain (i.e. subject matter) than others.

One example of a currently available decision support system is Hewlett-Packard's internal KnowledgeTrees system used for customer support. In KnowledgeTrees, decision graphs are explicitly coded with answers to the questions which lead to a solution. A decision support system such as KnowledgeTrees has several drawbacks. First, since each question can only have one of multiple hard-coded answers, multiple conclusions are not supported. Secondly, this system is not designed to allow the same question-answer to be explored for a given problem. For example, the same question-answer cannot be explored multiple times for each printer in a network. Furthermore, while decision graphs are useful for small and moderately complex graphs, and are typically easy to author, the cost of maintaining consistency and authoring against large and complex graphs is prohibitive. Also, decision graphs are insufficient to encode the problems of complex inter-dependent system problems, particularly when distributed automated agents are needed.

KnowledgePak, a diagnostic support system sold by ServiceWare, is similar to KnowledgeTrees in that it integrates the questions and answers with the control logic. KnowledgePak, however, uses a case-based structure, using a case as the defining and organizing object. Other objects in KnowledgePak include Symptoms, CaseDetail, and Solution Definition Objects. KnowledgePak is limited to isolating a diagnostic problem to a single case or conclusion. Authoring into KnowledgePak requires significant expertise with the tool and with the diagnostic domain as authors are required to be able to distinguish among object types such as cases, causes, tests, remedies, and various other objects in KnowledgePak.

AdvantageKBS from Logica Corporation is based on an augmented fault model. This fault model is based on symptom, cause, test, and solution object classes. Each class describes a part of the diagnostic system requiring distinct relationships between objects in the class and to objects of other classes. Again, the goal of the decision support model is to isolate a single case that applies to the current session. The vendors of this knowledge base discourage wide authorship since the creation of usable diagnostic knowledge into their fault model requires special training.

E-Diagnostic, the current generation of self-solve diagnostic systems from Hewlett-Packard Company, is representative of classic diagnostic support systems. It is implemented by creating custom code that encodes the reasoning, knowledge, data collection and conclusions within a single program. The barrier to authorship is unacceptably high. Each author not only requires adequate domain knowledge of the diagnostic he or she is authoring, but also requires knowledge of software design and C++ programming (the language in which the program is written). The author then needs to integrate his module into the main product. The specialized skills required of authors for such decision support systems does not allow fast and flexible creation or modification to the systems.

This invention addresses some of the deficiencies of currently available reasoning systems of knowledge representation paradigms. Reasoning systems of existing paradigms tend to associate problems with a single cause, or origin of the problem. This limits the wide range of decisions that can potentially be made with respect to a given problem, and limits the conclusions that can be inferred from the decisions. Furthermore, these reasoning systems do not support reentrant capabilities, or the ability for a given part of a defining knowledge structure to be repeatedly explored, such as in different contexts. Lastly, these reasoning systems have not struck the critical balance between the simplicity of a knowledge representation that encourages wide authorship by experts, and the depth of representation necessary to make the knowledge usable by a knowledge reasoning system.

A need exists for a method and apparatus to address these concerns.

SUMMARY OF THE INVENTION

This invention is, in general, directed to a method and apparatus for a compositional decision support reasoning system.

Thus, the invention may comprise apparatus for determining one or more solutions to a problem, comprising at least one computer readable medium and computer readable program code stored on the computer readable medium, comprising program code for traversing at least one path in one of at least one pursuit associated with the problem to generate one or more decision paths, the code comprising program code for processing a given one of the nodes in a path, comprising program code for evaluating a premise if the node type is a premise node, and passing the premise node if said premise passes, and program code for noting a conclusion if the node type is a conclusion node, for withdrawing any previous conclusions that are not associated with a parent node of the conclusion, and passing the conclusion node; program code for processing a child node of the current node if the current node is not a leaf node and is a node that passes; program code for terminating one of the decision paths if the child node cannot be processed, comprising asserting all noted, but non-withdrawn conclusions; and program code for generating a second of one or more paths in a given pursuit.

The invention may also comprise an apparatus for determining one or more solutions to a problem, comprising means for processing a given one of at least one node, the processing comprising means for evaluating a premise if the node type is a premise node, and passing the premise node if the premise passes; and means for noting a conclusion if the node type is a conclusion node, for withdrawing any previous conclusions that are not associated with a parent node of the conclusion, and passing said conclusion node; means for processing a child node of the current node if the current node is not a leaf node and is a node that passes; means for terminating a decision path if the child node cannot be processed, comprising asserting all noted, but non-withdrawn conclusions; and means for generating a second of one or more decision paths.

The invention may further comprise a method for determining one or more solutions to a problem, comprising traversing at least one path in one of at least one pursuit to generate one or more decision paths, the traversing comprising processing a given one of the nodes in a path, the processing comprising evaluating a premise if the node type is a premise node, and passing the premise node if the premise passes; and noting a conclusion if the node type is a conclusion node, withdrawing any previous conclusions that are not associated with a parent node of the conclusion, and passing the conclusion node; processing a child node of the current node if the current node is not a leaf node and is a node that passes; terminating a decision path if the child node cannot be processed, comprising asserting all noted, but non-withdrawn conclusions as a solution to the problem; and generating a second of said one or more decision paths.

BRIEF DESCRIPTION OF THE DRAWING

An illustrative and presently preferred embodiment of the invention is illustrated in the drawing in which.

DESCRIPTION OF PREFERRED EMBODIMENTS

Figure 1:
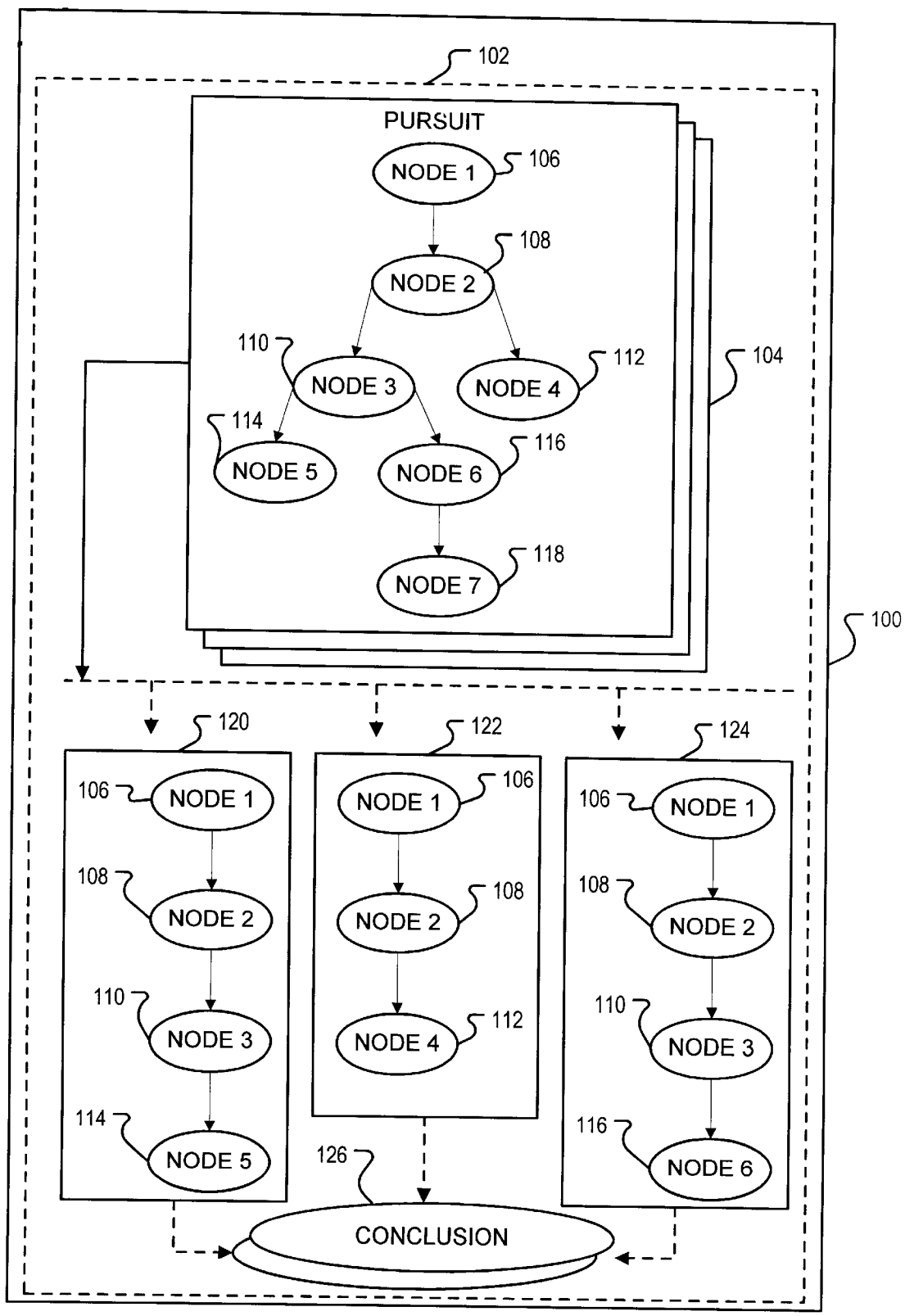
FIG. 1 illustrates an apparatus for a compositional decision support reasoning system.

FIG. 1, in general, illustrates an apparatus for a compositional decision support reasoning system 102 for determining one or more solutions 126 to a problem, comprising program code on at least one computer readable medium 100 (only one shown) for traversing at least one path in a pursuit 104 to generate one or more decision paths 120, 122, 124, where the apparatus also comprises code for processing nodes 106, 108, 110, 112, 114, 116, 118 by evaluating premise nodes and passing premise nodes if the premise passes; noting, passing, withdrawing, and asserting conclusion nodes; processing a child node if the current node passes, and is not a leaf node; and terminating a decision path if a child node can't be processed, comprising asserting all noted, but non-withdrawn conclusions; and generating a second of one or more paths in a given pursuit.

Figure 2:
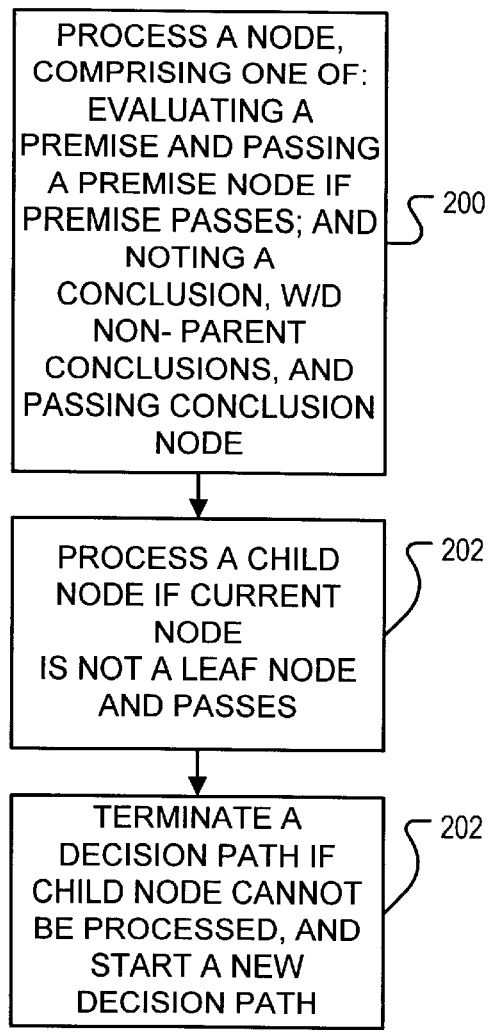
FIG. 2 illustrates a method for a compositional decision support reasoning system.

FIG. 2, in general, illustrates a method for a compositional decision support reasoning system for determining a solution to a problem, comprising processing a node, including evaluating a premise and passing a premise node if the premise passes, and passing a conclusion, withdrawing a parent conclusion, noting the conclusion, and passing the conclusion node 200; processing a child node if the current node is not a leaf node, and passes 202; and terminating a decision path if a child node cannot be processed, and generating a new path 202.

Throughout the description, the conclusion that is noted is temporarily designated as one of one or more conclusions for a decision support session. A conclusion that is asserted is a conclusion that has final designation as one of one of more conclusions for a decision path.

Introduction

Figure 3:
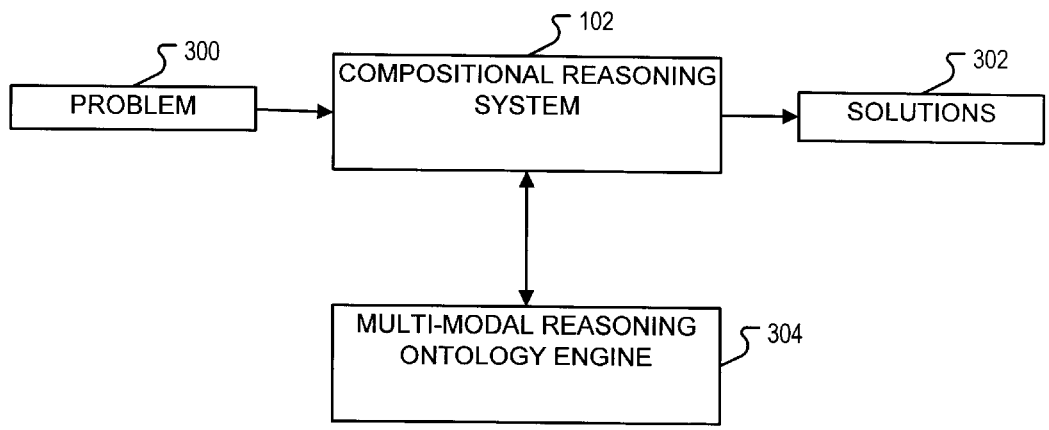
FIG. 3 illustrates an infrastructure for a compositional decision support reasoning system in a preferred embodiment.

A compositional decision support system is compositional in that the logic behind the system is dynamically determined, or composed, during a decision support session by the generation of paths, and by the processing of nodes. In a preferred embodiment, a compositional decision support reasoning system operates within a decision support system. An apparatus within an infrastructure in a preferred embodiment is illustrated in FIG. 3. It illustrates that a compositional reasoning system 102 interacts with a multi-modal reasoning ontology engine 304 to determine solutions 302 to a problem 300.

Figure 4:
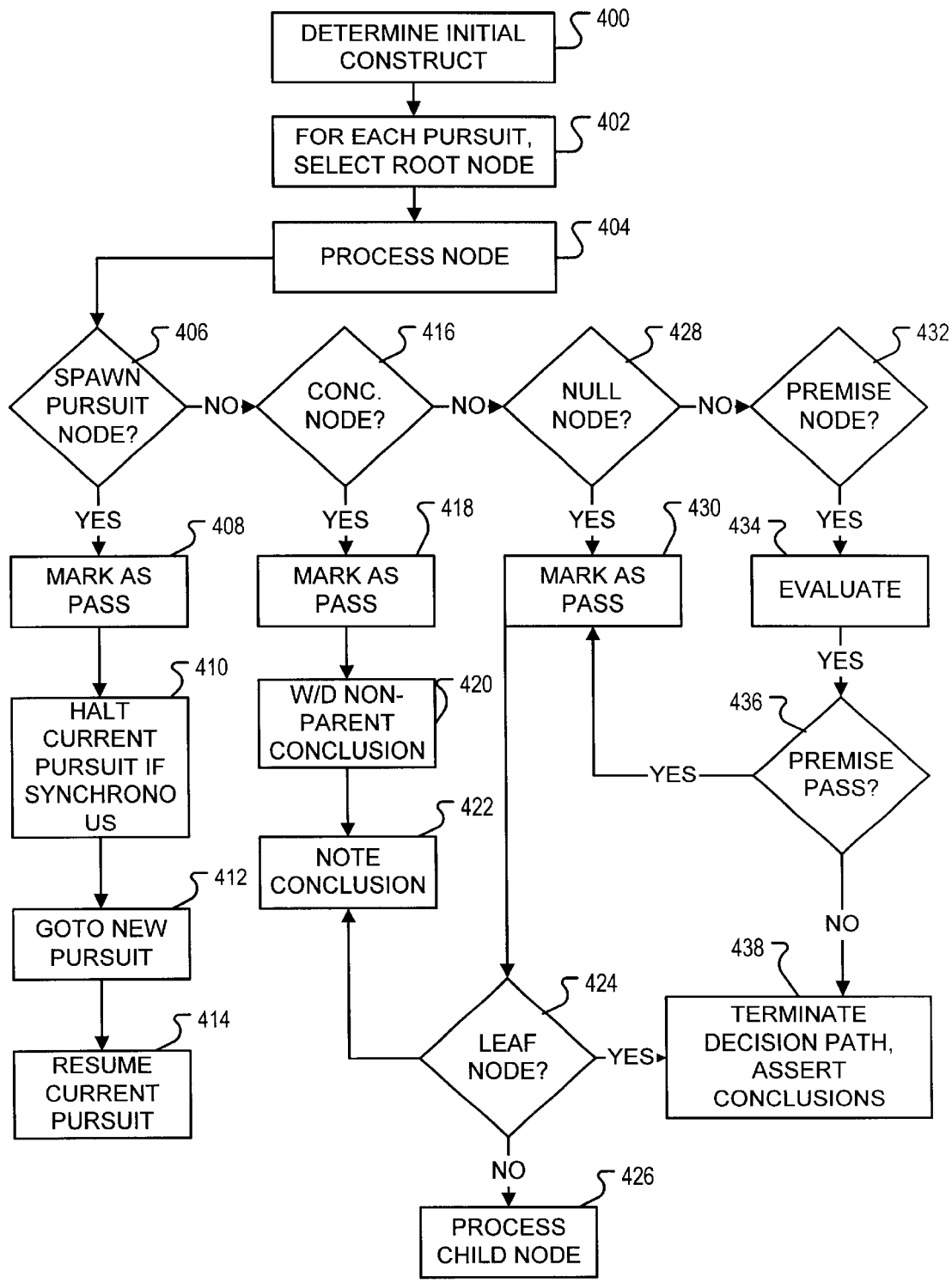
FIG. 4 illustrate a method for a compositional decision support reasoning system as operable in a preferred embodiment.

A method for this invention as operable in an infrastructure of a preferred embodiment is illustrated in FIG. 4. An initial construct, or set of pursuits is first determined 400. For each pursuit in the initial construct, a root node is selected 402. This root node is the first node for all decision paths in the given pursuit. Each node in the pursuit is processed 404. A number of decisions are made as to the type of node processed 406, 416, 428, 432. If it is a spawn pursuit node, then the node is marked as pass 408. If the spawn pursuit node is synchronous with the current pursuit, then the spawned pursuit must complete before the current pursuit can be continued. As a result, the current pursuit must be temporarily suspended 410. The spawn pursuit 412 begins. Once it completes, the current pursuit resumes 414. If the node is a conclusion node 416, then it is marked as pass 418. Conclusions previously noted are withdrawn unless they are associated with a parent node of the current node 420, and the current conclusion is noted 422. If the node is a null node, then it is marked as pass 430. If the node is a premise node, the premise is evaluated 434. If the premise passes 436, then the premise node is marked as pass. If the premise does not pass, then the current decision path is terminated, and all noted conclusions that have not been withdrawn are asserted 438. A new decision path in the current pursuit is started. For all nodes that pass, it is then determined if the node is a leaf node 424. If it is, then the decision path is terminated and noted, but non-withdrawn conclusions asserted 438, supra. If the node is not a leaf node, then its child node is processed 426.

A compositional decision support reasoning system of this invention obtains a problem that needs to be solved, interacts with a multi-modal ontology engine to obtain knowledge, and uses this knowledge to make decisions that lead to a solution to the given problem. A solution can comprise a number of conclusions which can be in the form of information, or an action to be taken to resolve the problem.

A compositional decision support reasoning system incorporates a control flow algorithm which operates on task-result knowledge objects to create a knowledge model. (A multi-modal reasoning ontology engine comprising task-result knowledge objects is the subject of the aforementioned copending patent application.) A knowledge model of this invention is a control structure called an Incremental Conclusions Graph (ICG). An ICG is a compositional, generalized decision graph that comprises a potentially large number of pursuits. Each pursuit comprises nodes, where each node is a premise node, conclusion node, a spawn pursuit node, or a null node. Premise and conclusion nodes are associated with task-result pairs. Directed arcs connect these nodes, allowing the nodes to be logically traversed in order to determine a solution to a problem. Each distinct traversal from a root node of a pursuit is called a decision path. A pursuit may cover a variety of decision support phases, including classification, narrowing, clarification, and remediation.

A representation called Exception Directed Acyclic Graph (EDAG) has been proposed in literature to simplify and organize large, incomprehensible decision trees built by machine-generated rule bases. EDAG's are primarily a rule reduction technique for human maintenance of large rule bases for a single particular focus. While EDAG's incorporate the notion of premises and conclusions, there are numerous differences between EDAG's, and an ICG of the present invention. EDAG conclusions are excepted by descendant premises in a graph, whereas ICG conclusions are excepted by descendant (non-child) conclusions in a graph. EDAG's are also monolithic in that the entire knowledge representation in an EDAG must be explored in a decision support session. In an ICG, the knowledge representation is segmented into pursuits, which allow a subset of the knowledge representation to be explored in a decision support session. Other differences exist between EDAG's and ICG's, such as the concept of contexts and initial constructs. These are discussed in more detail below.

Incremental Conclusions Graph (ICG)

An ICG is a compositional, generalized decision graph that comprises a number of self-contained Directed Acyclic Graphs (DAG) called pursuits.

Pursuits

A pursuit is defined for a specific problem to be solved. For instance, a pursuit can be defined for determining if a Visual Basic program is exposed to the Y2K bug, and if so, creating a fix for it. A pursuit can also be defined for checking the status of a printer, for example. Any given problem can have more than one pursuit. A pursuit comprises one or more paths that can be potentially traversed to determine one or more solutions to a problem. During a decision support session, one or more of these paths in a pursuit is traversed to generate a decision path. Put another way, a decision path is a path that is or has been traversed in pursuit of finding a solution to a problem, whereas a path may potentially be traversed. In a preferred embodiment, each path in a pursuit is traversed, although not every node in a given path must be traversed. A decision path is a linear path in a DAG that comprises at least one traversed node in a decision support session. In each decision path, there is at least one node, one of which is a root node. A root node is where a decision path begins. If a path is completely traversed, (i.e., each node in a path is traversed), a leaf node is reached, and that decision path comprises both a root node and a leaf node. A leaf node is a node that does not comprise any children nodes. Conversely, if a decision path is not completely traversed, the decision path terminates at an ancestor node of a leaf node.

A subsequent node is traversed if a current node passes, and the current node is not a leaf node. In other words, a decision path continues until a current node is a leaf node, or until a current node fails. A node fails if it is a premise node that fails evaluation. A premise node fails evaluation if it is required to be true to pass but evaluates as false, or it is required to be false to pass but evaluates as true. Within a pursuit, the core knowledge components, i.e., the nodes which comprise the knowledge from which decisions are actually made, are the premise nodes and the conclusion nodes.

A decision path that is traversed is a path in which one or more nodes is traversed. When a node is traversed, its information is processed as follows. When a traversed node is a premise (from an interrogative task-result pair), the premise is evaluated. If it passes (and it is not a leaf node), then the decision path to the next node is traversed. If a premise fails at this next node, then the decision path is terminated. When a traversed node is a conclusion (from a declarative task-result pair), it is noted as a conclusion. A conclusion that is not a leaf node is called an incremental conclusion. If a subsequently traversed node is a conclusion, the subsequent conclusion is noted as a conclusion, and any previously noted conclusion is withdrawn unless the previously noted conclusion is a parent of the subsequent conclusion. (A parent node is a node that directly precedes a given node. On the same note, an ancestor node includes a parent node and all nodes preceding the given node.) If a previously noted conclusion is a parent of the subsequently noted conclusion, both conclusions can be noted. Within each decision path, therefore, there can be multiple conclusions. Each path in a pursuit is traversed until all paths in the pursuit have been traversed. At that point, all noted conclusions that have not been withdrawn can be asserted as final conclusions. The traversal of nodes that are knowledge components (i.e., premises or conclusions) form the basis for determining one or more solutions to a problem.

A pursuit can be authored by a knowledge expert. As a pursuit encompasses a logical method by which a given problem can be resolved, an expert in the problem area authors or encodes knowledge into a compositional decision support reasoning system. This is accomplished by creating paths from task-result knowledge objects that can be used to form a solution to the given problem. The set of all the paths that can potentially be traversed for a given problem make up a pursuit.

Figure 5:
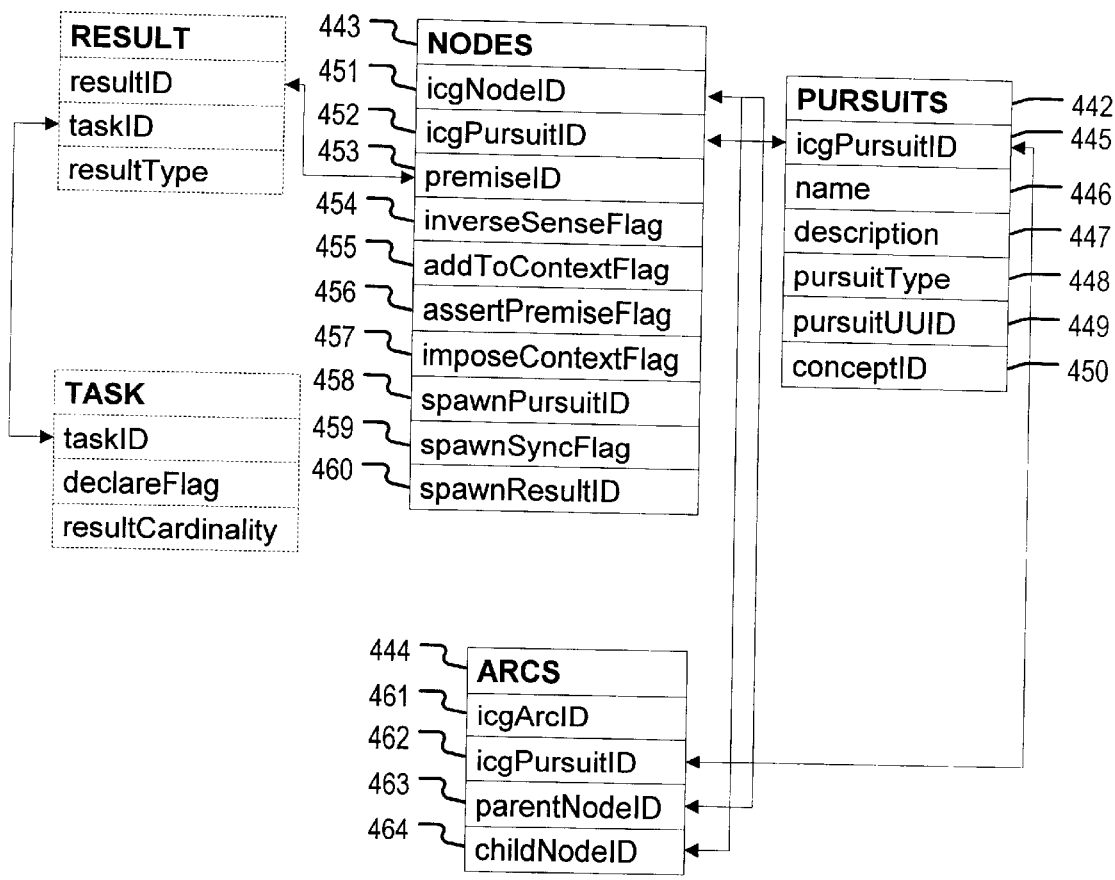
FIG. 5 illustrates the relationships between elements in an embodiment of a relational database.

A pursuit 442 (FIG. 5) is implemented by defining a plurality of nodes 443 that are connected by arcs 444. There are many well-known methods by which this structure can be implemented. One example, as used in a preferred embodiment of this invention, is a relational database. In a relational database, a table is defined for each of the following: pursuits 442, nodes 443, and arcs 444. The following tables illustrate an example of how these tables can be defined:

Pursuits 442

| Field | Description |
| --- | --- |
| icgPursuitID 445 | unique number assigned by the database for this ICG pursuit |
| name 446 | descriptive short name of this pursuit |
| description 447 | pursuit description line (might be displayed to user) |
| rootNodeID | the pursuit's root premise/conclusion node |
| pursuitType 448 | to specify if pursuit is NORMAL or SUBCALL |

-continued

Pursuits 442

| Field | Description |
| --- | --- |
| pursuitUUID 449 | global identifier across full knowledge base |
| conceptID 450 | match this pursuit with a concept |

Nodes 443

| Field | Description |
| --- | --- |
| icgNodeID 451 | unique number assigned by database for this node, which points to another node |
| icgPursuitID 452 | the ICG pursuit which includes this node |
| premiseID 453 | pointer to a result (in a task-result pair) for this premise or conclusion. If 0, the node is a null node. |
| inverseSenseFlag 454 | When yes, this premise is required to be false for the node to pass. |
| addToContextFlag 455 | When yes, this Premise node is added to Context for current pursuit. |
| assertPremiseFlag 456 | When yes, the PremiseID is asserted automatically, and the node is set to pass. |
| imposeContextFlag 457 | When yes, the next premise/conclusion will be annotated to be local to the pursuit's context. |
| spawnPursuitID 458 | To be used when this node is a spawned pursuit node. This is the spawned pursuit ID. |
| spawnSyncFlag 459 | To be used when this node is a spawned pursuit node. When yes, the new pursuit must be completed before this node is complete. Otherwise, this path can continue asynchronously. |
| spawnResultID 460 | To be used when this node is a spawned pursuit node. If non-zero, the premise identified by spawnResultID supplies the context. If corresponding task has cardinality <>1, the pursuit is spawned multiple times. |

Arcs 444

| Field | Description |
| --- | --- |
| icgArcID 461 | unique number assigned by the database for this ICG arc |
| icgPursuitID 462 | the ICG pursuit which includes this arc. |
| parentNodeID 463 | the ICG node which this arc points from. |
| childNodeID 464 | the ICG node to which this arc points. |

The fields defined in these tables represent examples of the types of fields that can be defined for implementing pursuits, nodes, and arcs in a relational database. The Nodes table maps the core knowledge statements in the ICG control structure. The fields are associated with three different node types as follows:

2. Premise/conclusion node: premiseID 453, premiseSetID, inverseSenseFlag 454, addToContextFlag 455, assertPremiseFlag 456, and imposeContextFlag 457 are used in this context. Although denoted premiseID 453, it is important to remember that this type of node can either be a premise or a conclusion: this is because a task in a task-result pair can either be an interrogative task (in which case the corresponding task-result pair is a premise), or a declarative task (in which case the corresponding task-result pair is a conclusion).

3. Spawn node: spawnPursuitID 458, spawnPursuitAsSubFlag, spawnResultID 460 are used to set the rules for the spawned pursuit.

4. Null node: premiseID 453 and spawnPursuitID 458 are set to 0. The other columns are ignored.

It should be understood that some fields may not be needed, and that other fields may defined. For example, a field called pursuitVersionID can be defined to distinguish between versions of pursuits, allowing multiple versions of a pursuit to exist. The relationship between these elements is illustrated in the following diagram:

Each node 443 is related to at least one other node 443 by an arc 444. This relationship is defined by an icgArcID 461, which connects a parent node, parentNodeID 463, to a child node, childNodeID 464. A parent node may have more than one child node, and a child node may have more than one parent node. All nodes and arcs belong to a given pursuit, ICGPursuitID 462.

Contexts

A pursuit operates within a context that is designated by the reasoning system. A context comprises a plurality of premises and/or conclusions that are logically related to form a fact base for any given context. These premises or conclusions that help define a context are typically declared among particular nodes of the pursuit. For example, if the reasoning system designates a context as "HP LaserJet 4L Printer", then a premise or conclusion that corresponds to a node in which its field addToContextFlag is set to "YES" is added to the context "HP LaserJet 4L Printer". Furthermore, if that premise or conclusion corresponds to a node in which its imposeContextFlag is set to "YES", then premises or conclusions corresponding to children nodes of that premise or conclusion are also annotated with the context. When a premise is annotated with a context, its semantic validity is scoped to that context, a opposed to a global scope. Thus, if a node having its addToContextFlag field set to "YES", its imposeContextFlag set to "YES", and the premise is "Is the printer on: YES", then the asserted premise is asserted within the context of the HP LaserJet 4L Printer, limiting it to that context, rather than a global context of all printers.

ICG Control Flow Algorithm

ICG's do not require that the entire knowledge model be explored during a decision support session. This feature provides the ability to segment the knowledge base for several reasons, including modularity, scalability, knowledge distribution, knowledge entitlement, and security.

An algorithm which operates on an ICG in a preferred embodiment is follows:

1. Construct an initial construct $P_s$ of pursuits p found in the ICG $\theta$, where $P_s \subseteq \theta$ and $P_s \neq \theta$.

2. Select the root node $n_{01}$ for a pursuit $p_i$ where $p_j \in P_s$. The first path $t_{0,i}$ of k paths is established. (Other paths are established in step 5.)

3. If the node is not a spawn pursuit node:
    a. If the task-result pair corresponding to the node is a premise (i.e., an interrogative task):
        i. If the node is not an assert premise node (assertPremiseFlag is set), then evaluate the premise. If the node must evaluate as true to pass, and evaluates as true, then the node is marked PASS. If the node must evaluate as false to pass, and evaluates as false, then the node is marked PASS. If the node must evaluate as true to pass, and evaluates as false, then the node is marked FAIL. If the node must evaluate as false to pass, and evaluates as true, then the node is marked FAIL. If the premise is inconclusive, or cannot be evaluated at that time, then mark the node as FAIL.
        ii. If logic dictates that the premise should be asserted, then assert the premise without evaluating it. Mark the node PASS.
    b. If the task-result corresponding to the node is a conclusion (i.e., a declarative task), then the conclusion is noted, and any previously noted conclusion is withdrawn (unless the previous conclusion is a parent of the current conclusion node). Mark the node PASS.
    c. If the node is a null node, then the node is marked as PASS.

4. If the node is a spawn pursuit node, mark the node as PASS. Satisfy any premises that are designated to establish the context of the pursuit, link to pursuit $p_j$, and add $p_j$ to $P_s$.
    a. If the spawning is synchronous with $p_j$, current path $t_x$ is blocked until $p_j$ completes.
    b. If the corresponding task has cardinality < >1, repeat this step for each context.

5. If the node has n-way branching (more than one child), add n−1 new paths to the pursuit, $p_i$.

6. If the node is marked PASS, and it is not a leaf node, repeat steps 3 to 5 for the next node $n_{r,i}$ on path t. If the node is marked FAIL, or if it is a leaf node, then terminate the path.

7. Repeat steps 3 to 6 for a next path, t in pursuit $p_i$. A next path can be the most recently added path for a given pursuit in a LIFO (last-in-first-out) fashion, for instance.

8. Repeat steps 2 to 7 for all $p_i \in P_s$.

9. When a pursuit has all its k paths terminated, determine the final conclusions. If a noted conclusion was withdrawn by any of the child paths, that conclusion is not asserted. Assert any noted, but not withdrawn conclusions as final.

The first step in the algorithm of a preferred embodiment is to establish an initial construct. An initial construct is analogous to a problem statement or a topic to be investigated. The process of establishing this initial construct includes selecting or identifying some set of initial pursuits to be explored. However, this may be done indirectly through such means as selection of topics, selection of a high-level pursuit, or translating a natural language specification of the pursuit into an identification of an appropriate subset of pursuits from the overall set of available pursuits in the ICG. For example, a user may input several keywords, or write a symptom in natural language, such as "I cannot print on our color printer." These keywords select pursuits ranked on the occurrence or frequency of keywords in the pursuit's description, task text, or result text in that pursuit. Once the initial construct is completed, the ICG pursuit logic continues by the remaining steps in the algorithm, supra.

Each pursuit comprises a reference to a root node in the pursuit, rootNodeID. The root node is traversed. A subsequent node is traversed if a current node is not a leaf node, and the current node passes. A current node passes if it is a null node, a spawn node, a conclusion node, or a passed premise node. All subsequently traversed nodes are descendants of the root node. If any given node is a task-result pair that is a premise, the premise is evaluated, i.e., a question is posed to a user, the task is assigned to an agent, or logic dictates that the premise should be asserted. If the evaluated premise is true (or false if the node's inverseSenseFlag is set to "YES"), then the evaluated premise is asserted. The node associated with the asserted premise is a passed premise node, and the premise node is marked "PASS". If the evaluated premise is false, then the node associated with the evaluated premise is marked "FAIL", and the path is finalized at the parent node (i.e., the last node that passed). If the premise is unknown (because an evaluation is inconclusive, for example, or a method is not currently available to evaluate the premise), then the premise is scheduled for evaluation.

If a node is associated with a task-result pair that is a declarative, then the node is a conclusion node, and is noted as a conclusion for the particular path. Noting a conclusion replaces a previously noted conclusion unless the previously noted conclusion is a parent of the current conclusion node. In other words, a noted conclusion and its child node can both be noted. As a result, there can be multiple conclusions for each pursuit.

If a node has a spawnPursuitID, then a new pursuit identified by the spawnPursuitID is started. If the spawning is synchronous with the current pursuit (i.e., spawnPursuitAsyncFlag is set to "YES"), then the first path is blocked until the new pursuit completes. If a spawning is asynchronous, then the paths in question do not have to be executed as a single pursuit. In other words, the spawned pursuit can run simultaneously with the calling pursuit.

One or more next nodes are created by referencing the parentNodeID field in the Arcs table. A node is created for each childNodeID corresponding to the given parentNodeID. If there are n children from a given node, where n>1, (i.e., there are multiple arcs for an asserted premise), then n−1 new paths are created. The nodes are then analyzed in a manner described above. The traversal of a given decision path in a pursuit continues until a premise is evaluated as false (or true if the node's inverseSenseFlag is set to "YES") , or until a leaf node is reached. At that point, that decision path is terminated. When all paths in a pursuit have been terminated, final conclusions can be determined. If a noted conclusion was withdrawn in any of the child paths, that noted conclusion is not asserted. The remaining conclusions are asserted as final.

Example Implementation

An ICG decision support reasoning system can be used in a diagnostic fashion to solve problems related to a printer system, for example. An expert in this area would create a number of task and result objects for solving problem related to printers. A number of interrogative tasks related to printer problems are illustrated in the following table:

| Tasks | Results |
| --- | --- |
| Examine all printers? | Yes |
|  | No |
| Location of this printer? | Local |
|  | Networked |
| Ping to device? | OK |
|  | Failed |

-continued

| Tasks | Results |
| --- | --- |
| What is the printers' name? | <name> SOLICITONE |
| What are the printers' names? | <name1, name2, . . . > SOLICITMANY |
| What is the device's name? | <name> SOLICITONE |
| What is the IP address for the device? | <nn.nn.nn.nn> SOLICITONE |
| What is the spooler system's name? | <sysname> SOLICITONE |
| Are local printer drivers installed properly? | Yes |
|  | No |
| What does the printer status say? (cardinality = 1) | Internal Jam |
|  | Toner Low |
| Is the printer connection tight? | Yes |
|  | No |
| Is the spool queue showing? (cardinality = 0) | Stuck jobs |
|  | Paused |
|  | Empty |

These tasks must be discovered by a user or another method. For instance, "Examine all printers?" is an interrogative task that can be posed as a question to the user. The user's response then determines the path in which the algorithm will take. The task "Are the local printer drivers installed correctly?" could be discovered by a knowledge agent such as a program querying an operating system API (application programming interface). A default method is to pose these tasks for the user to answer in an interactive session on a web page, for example. When there are other methods available, a knowledge agent could accomplish the task and provide the result(s) without requiring a user's input. For example, an agent could utilize TCP (Transmission Control Protocol) services to obtain the IP (Internet Protocol) address of a device name on a network more efficiently than a user could provide it.

The following table contains declarative tasks, wherein the task-result pairs form conclusions:

| Tasks | Results |
| --- | --- |
| Reinstall local drivers | Yes |
|  | No |
| Print spool queue status is: | Unknown |
|  | Require Helpdesk |
| Network connection status is: | OK |
|  | Inaccessible |
| Printer is OK based on this check. | — |
| Printer needs service: (cardinality = 0) | Paper Jam |
|  | Change toner cartridge |
|  | Tighten loose connection |
| Ping test program is unavailable. | <error code> |
| The spooler is not working properly. | — |

Figure 6:
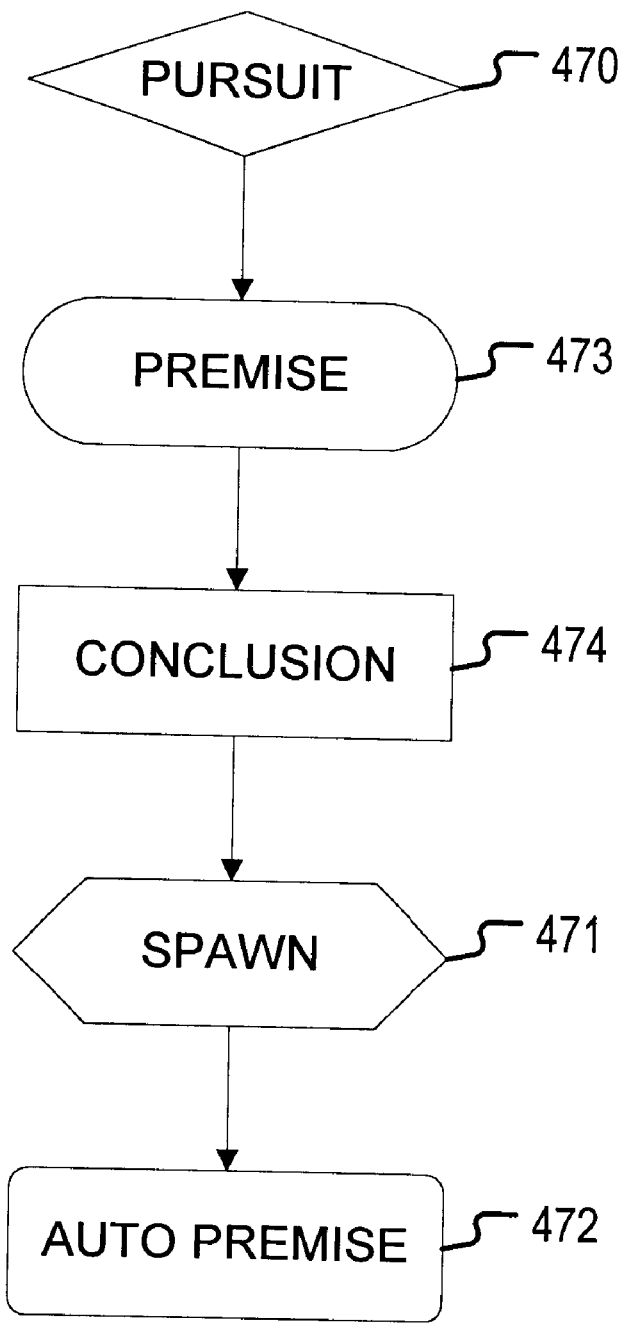
FIG. 6 illustrates the notations used to describe an embodiment of an Incremental Conclusions Graph.

To establish a logical connection between these objects, an expert would encode the task-result logic into a reasoning system. As discussed in the aforementioned copending patent application, task and result knowledge objects are compatible with any reasoning system which has requirements for obtaining an evaluation of questions. One such reasoning system is the compositional decision support reasoning system of this invention. This entails implementing logic control to emulate a group of decisions that can be made in pursuing a solution to a given problem. In a compositional decision support reasoning system, these decisions for a given problem are derived from tasks and results that can be graphically represented in an Incremental Conclusions Graph (ICG) knowledge representation model. While the storage representation of these decisions can be implemented using a number of well-known methods, such as tables, pointers, and relational database schemas, the logic is easier to comprehend when represented in a graphical format. Thus, the following notations are used in describing an ICG:

A group of decisions that can be made for a particular problem is called a pursuit 470 (FIG. 6). Within a pursuit, each series of decisions is called a decision path, made up of a number of nodes. Decision paths can be congruent, or they can be mutually exclusive. If the solution to one problem entails finding a solution to another problem, then a first pursuit can start another pursuit, which is referred to as a spawn 471. An auto premise node 472 is a premise 473 or a conclusion 474 that passes as a result of the reasoning system logic, rather than as a result of being evaluated (i.e., by querying a user, or by invoking a knowledge agent). Although the following ICG example uses the concept of an auto premise node 472, an auto premise node 472 is, for all intents and purposes, essentially a premise 473. It is the responsibility of a particular knowledge author to determine whether or not to use auto premise nodes 472 in a given implementation.

Example Pursuits

The following table lists examples of pursuits which make use of the tasks and results above. The descriptions serve as abstracts which can be used in a keyword search to match a user's symptoms of a problem:

| Pursuit | Name | Description |
| --- | --- | --- |
| 1 | Printer System | Investigates printer system problems, including the spooler, drivers, and network. |
| 2 | Printer Health | Checks the printer's normal operations and failure modes, whether the printer is local to the client system, or on the network. |
| 3 | Spooler Health | Checks to see if the printer spooler computer is working properly. |
| 4 | Network Access to Device | Checks to see if a device is accessible from the network. |

Each pursuit comprises a single rooted acyclic graph made up of nodes connected by arcs. These arcs, since they are directed, point to child nodes. A node without child nodes is a leaf node. Every unique trace from the root node is called a decision path through the graph. When a pursuit is in action, a decision path may end before it reaches a leaf node.

Figure 7:
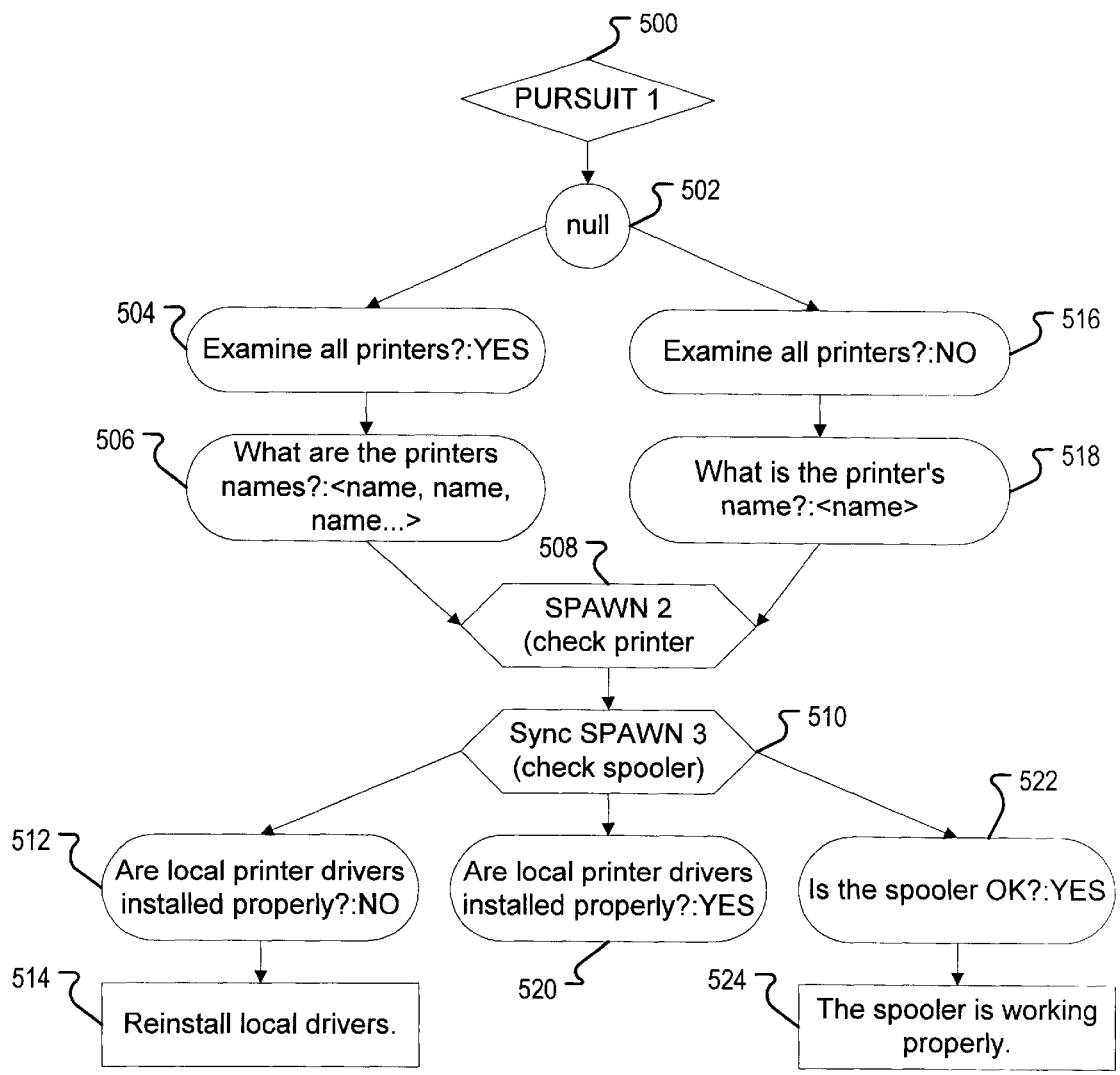
FIGS. 7–10 illustrate examples of pursuits within a compositional decision support reasoning system.
Figure 8:
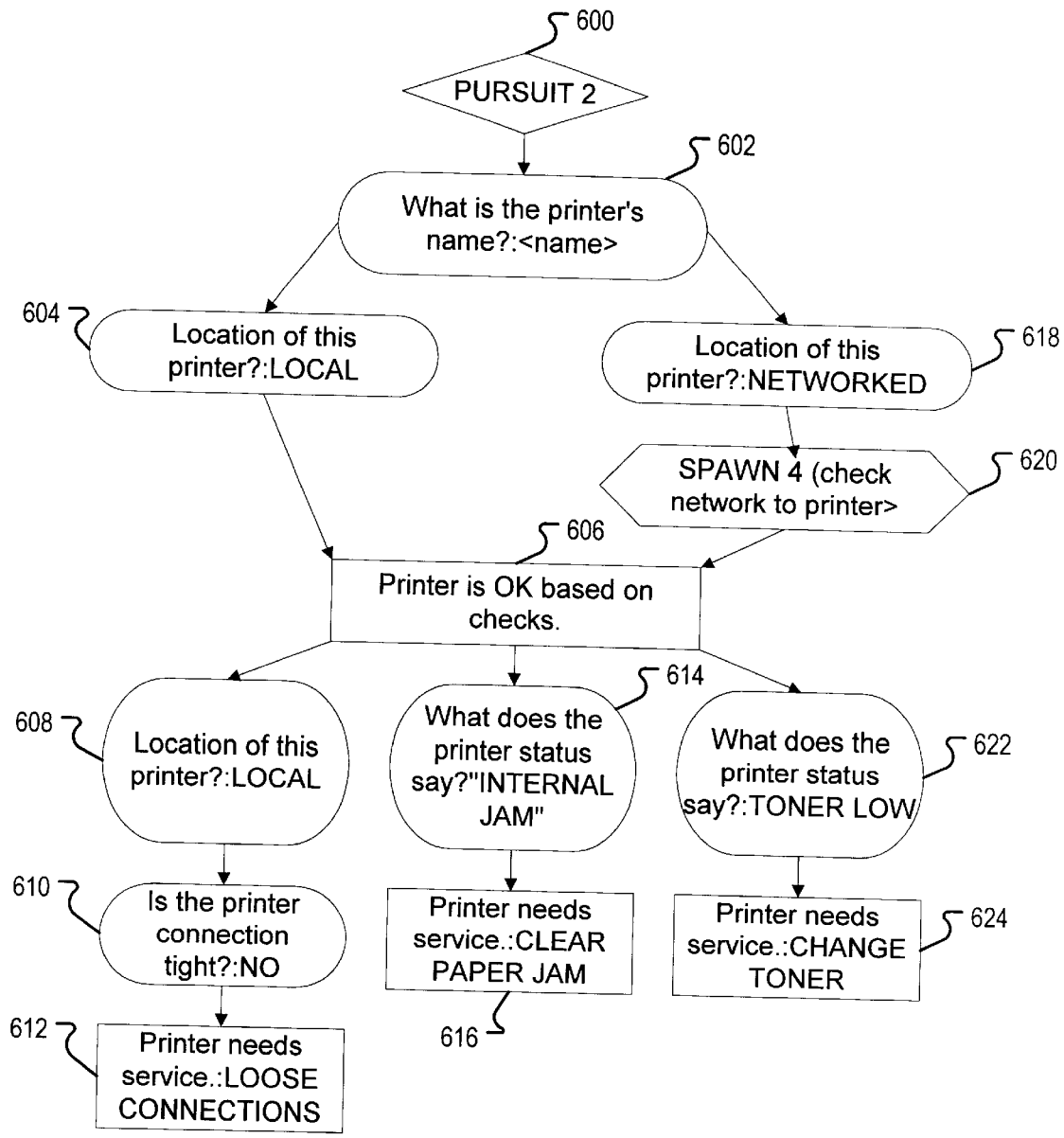
Figure 9:
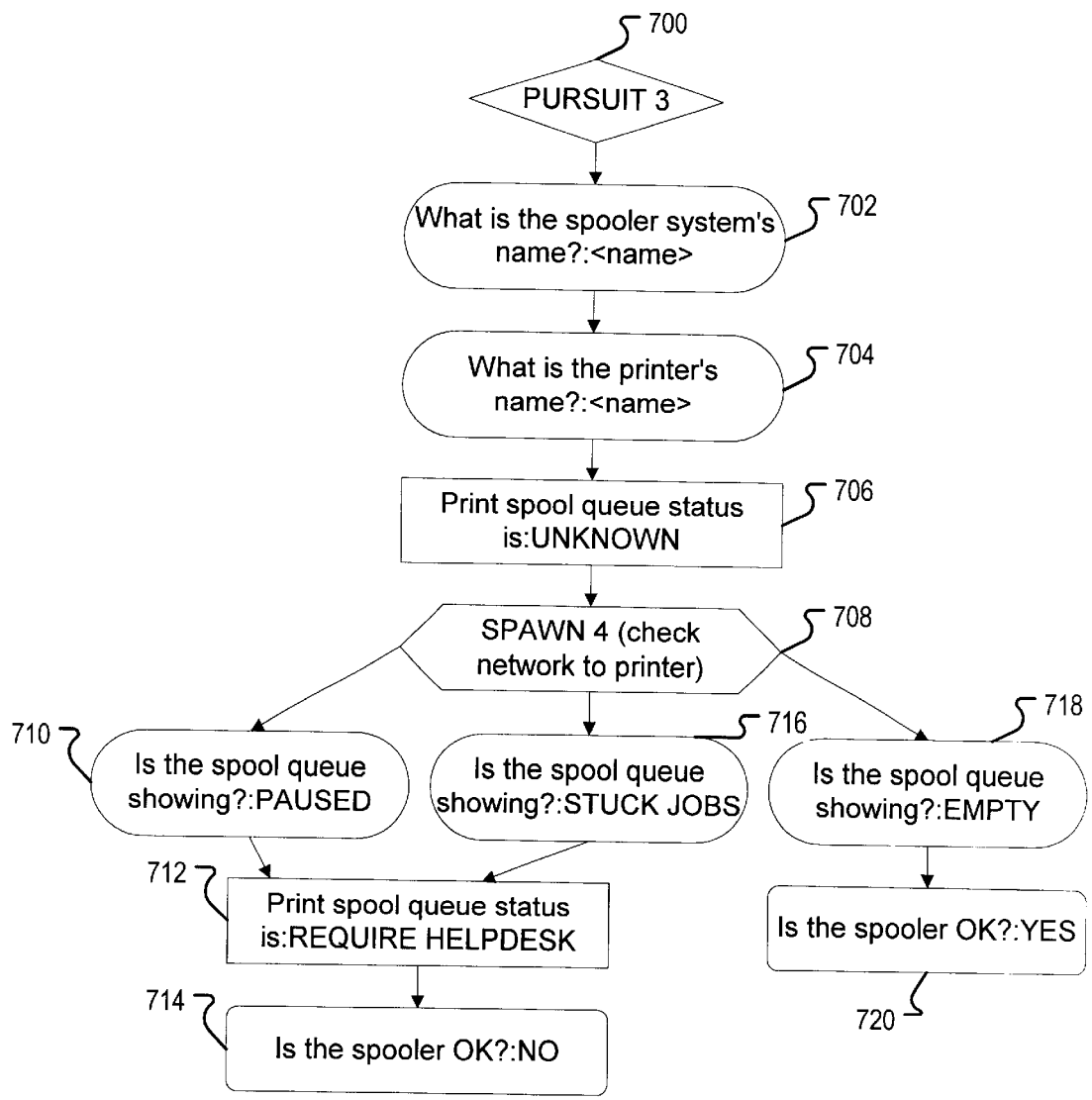

Pursuit 1 500 (FIG. 7) looks at several components of a printer system. It comprises a null node 502, premises 504, 506, 512, 516, 518, 520, 522, conclusions 514, 524, and two spawn pursuit nodes 508, 510 to gather information about printer names, and ensures that the local printer drivers are correct for the configured printers. Pursuit 1 500 spawns Pursuit 2 600 (FIG. 8) and Pursuit 3 700 (FIG. 9) to check sub-components of a given printer system, namely the printer device, and the computer system providing the print spool queues. This decomposition of the diagnostic decision support into separate pursuits tends to improve the Pursuits' manageability and extensibility.

Pursuit 2 600 is spawned asynchronously allowing this pursuit to continue in parallel with Pursuit 1 500. Pursuit 3 700 is spawned synchronously. This means that the descendant nodes of the "Sync Spawn 3" node 510 are not traversed further until Pursuit 3 700 has completed. Since Pursuit 2 600 is asynchronous, Pursuit 3 700 may be run concurrently with the earlier Pursuit 2 600.

If a user wants more than one printer examined, the names of all the printers to be diagnosed are supplied by the task "What are the printers' names?" which is of type SOLICITMANY, supra. The "Spawn Pursuit 2" node 508 will spawn as many instances of the pursuit as there are printers names, with each name adding to the context of Pursuit 2 600.

Figure 10:
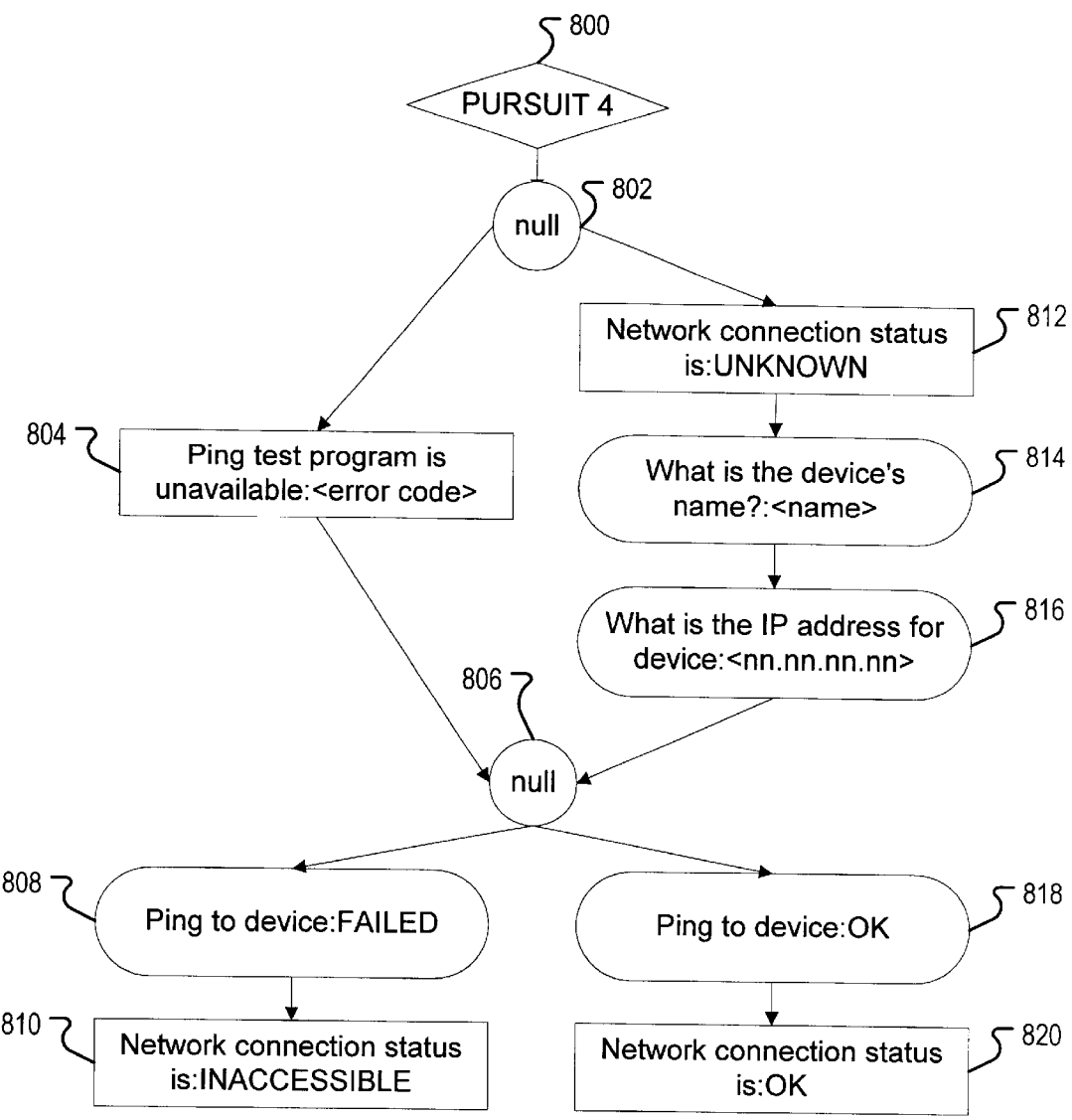

In Pursuit 2 600, the status of a physical printer is checked. It comprises premises 602, 604, 608, 610, 618, 614, 622, conclusions 606, 612, 616, 624, and a spawn pursuit node 620. The first premise, "What is the printer name?" 602, forms the context for this pursuit. (This premise and context may already be asserted by a calling pursuit, i.e., Pursuit 1 500). The repetition of a premise in a node ensures that this pursuit can be started as an initial pursuit rather than a spawn pursuit, and that it can request the necessary information about a printer's name. If the location of the printer in question is on the network, Pursuit 4 800 (FIG. 10) is spawned to ensure that the printer is addressable from the network. In either case, an incremental conclusion, "Printer is OK based on checks" 606 is asserted. This conclusion will only persist if no other conclusion is reached along any subsequent path. As Pursuit 2 600 demonstrates, the conclusions at the leaves of this graph are exceptions to the conclusion that the printer is OK.

It is important to note that the task named "What does the printer status say?" has a cardinality of 0, supra. This means that the status can indicate more than one condition (i.e., result). For example, the "Toner Low" and "Internal Jam" results can both be true, resulting in two evaluated premises that are true. In such a case, the two conclusions 616, 624 corresponding to the two evaluated premises 614, 622 indicate that there can be multiple faults to the given problem.

In Pursuit 3 700, the status of a spool queue is being examined. It comprises premises 702, 704, 710, 716, 718, auto premises 714, 720, conclusions 706, 712, and a spawn pursuit node 708. Again, the repetition of the premise in a node ensures that this pursuit can be started as an initial pursuit, and request the necessary information about the printer's name. The first two nodes 702, 704 form the context of this pursuit. The third node, "Print spool queue status is:UNKNOWN" 706, is an incremental conclusion that may later be withdrawn if the spool queue is found to have a problem. Pursuit 3 700 is an example of a pursuit that is traversed synchronously. Synchronous pursuits are often called from other pursuits since they assert premises that may be helpful to the other pursuits. When premises are asserted, they serve to advance paths in the other pursuits, but they are not presented as conclusions to the user. In effect, the validity of the premises is inferred from other premises earlier in the path.

Pursuit 4 800 tests whether there is network connectivity to a device. It comprises two null nodes 802, 806, premises 814, 816, 808, 818, and conclusions 804, 812, 810, 820. This pursuit is a typical test for most network devices, and is used by other pursuits when network connectivity is important. Two incremental conclusions are immediately made. One incremental conclusion is that the "Network status is:UNKNOWN" 812 at the beginning of the pursuit until more information is discovered. This conclusion will be final if the decision support system ends early with incomplete information. This incremental conclusion describes the current state of the test. Another incremental conclusion is that the "Ping test program is unavailable" 804. Both incremental conclusions can be replaced if a ping test is actually performed. The first premise, "What is the device's name?" 814, records the network device, and sets the context for the locally-scoped premises and conclusions in the pursuit. The first null node 802 serves as the entry point so that two incremental conclusions are immediately available. The second null node 806 simplifies the connections for multiple parents to child nodes.

Sample Decision Support Session

The first step in an ICG algorithm is to select one or more pursuits from all the pursuits in an ICG. This is referred to as the initial construct. Once the initial construct is selected, the ICG algortithm controls the progress through the one or more pursuits. For example, assume that a decision support user wants to use this system for printer system diagnostics. The user may be presented with a list of pursuits and their descriptions, which the user may select. Alternatively, the user may use keywords to describe a symptom. For a printer system diagnostic problem, a user would select Pursuit 1 500.

Pursuit 1 500 starts by asking the user if all printers should be examined. If the user responds with "NO", then the premise "Examine all printers:NO" 516 evaluates as true. The next node, "What is the printer's name?:<name>" 518, is then traversed. Its premise is a task-result pair in which the result is to be solicited from the user. If this node's addTo-ContextFlag is set to "YES" (or equivalent field or indicator thereof, then the node is added to the current pursuit's context. Similarly, if this node's imposeContextFlag is set to "YES" (or equivalent field or indicator thereof, then the next node will be annotated with the present context. If the user responds with a printer name called "LEGAL1", then this premise provides a context in which the next node, "Spawn 2" 508, will operate. The directive to operate within a context can either be provided by a current node, or the node itself. The directive to spawn a pursuit within a predetermined context can be determined within the spawn node. For example, a field spawnResultID indicates which premise should be added to the new pursuit's context.

"Spawn 2" node 508 invokes Pursuit 2 600. Pursuit 2 600 is spawned asynchronously allowing the pursuit to continue in parallel with the current pursuit, Pursuit 1 500. Thus, the next node in Pursuit 1, "Sync spawn 3" 510, is invoked. "Sync spawn 3" 510 invokes Pursuit 3 700, which is spawned synchronously to Pursuit 1 500. This means that any nodes subsequent to "Sync spawn 3" 510 in Pursuit 1 500 cannot be traversed until Pursuit 3 700 finishes. In summary, since Pursuit 1 500 may continue in parallel with Pursuit 2 600, Pursuit 3 700 may be executed (by virtue of "Sync spawn 3" 510). Pursuit 2 600 and Pursuit 3 700 may also run in parallel. However, since Pursuit 3 700 cannot continue until it completes, Pursuit 3 700 and Pursuit 1 500 cannot run in parallel.

In Pursuit 2 600, the first node asks for the printer name. Since Pursuit 2 600 is spawned from Pursuit 1 500, and Pursuit 1 500 is already operating within the context of "LEGAL1", Pursuit 2 600 also operates within the context of "LEGAL1". (This context can be inherited from the spawn node's spawnResultID node, or from the last premise or conclusion before the current pursuit). If the printer is a local printer (as determined by designated method), then the next node traversed is an incremental conclusion (because it is not a leaf node), namely, "Printer is OK based on checks" 606. This conclusion holds unless a subsequent conclusion (which is not a child node of it) is asserted.

Based on the current state of knowledge, two nodes can then be traversed. The first is a premise that reiterates the previous premise "Location of this printer?:LOCAL" 608. In an operable reasoning system, the previous premise (as all other evaluated premises) would likely be maintained in a premise maintenance system. As a result, the reiterated premise could be automatically asserted by the reasoning system. The node that is traversed following this premise evaluates whether the printer connection is tight. (Only one premise based on that task is shown.) Again, using the appropriate method, if the response to this task is "NO", then the premise that is asserted is "Is the printer connection tight?:NO" 610. The next node, "Printer needs service: LOOSE CONNECTION" 612, is a conclusion that can be noted. This conclusion withdraws the previous incremental conclusion "Printer is OK based on checks" 606. A second node that can be traversed after the incremental conclusion "Printer is OK based on checks" 606 is one of two premises based on the task "What does the printer status say?", the task having a cardinality of 0. Assuming that the printer indicates that the toner is low, the second premise, "What does the printer say?:TONER LOW" 622 is asserted. The conclusion "Printer needs service:CHANGE TONER" 624 can then be noted, withdrawing the previous incremental conclusion "Printer is OK based on checks" 606, and then asserted. In this pursuit, two conclusions are asserted.

In Pursuit 3 700, which runs in parallel with Pursuit 2 600, the first two nodes establish the context of the pursuit. An incremental conclusion, "Print spool queue status is:UNKNOWN" 706 is temporarily asserted until further information is obtained. Pursuit 4 800 is invoked by the next node, "Sync spawn 4" 708. Pursuit 3 700 is held until Pursuit 4 800 completes. In Pursuit 4 800, two incremental conclusions 804, 812 are immediately asserted. Information about a device and its IP address are then obtained by designated methods, and a ping test to test if the given device is connected to the Internet is attempted. If the ping test doesn't actually complete, then the two incremental conclusions 804, 812 stand. If the ping test completes, then one of two premises can be asserted, depending on the outcome of the ping test. Assuming that the ping test fails ("Ping to device:FAILED" 808 is asserted), then the conclusion "Network connection status is:INACCESSIBLE" 810 is asserted, withdrawing the two incremental conclusions 804, 812 in Pursuit 4 800. Pursuit 4 800 completes, and Pursuit 3 700 then resumes. Assuming that an appropriate method indicates that the spool queue is not showing anything, then the reasoning system automatically asserts the premise "Is the spooler OK?:YES" 720. In this example, no conclusions are asserted from Pursuit 3 700.

Pursuit 1 500 then resumes. The node comprising the premise "Is the spooler OK?:YES" 522 can be automatically asserted, as a premise asserted by Pursuit 3. A conclusion based on that premise, "The spooler is working properly" 524 is then asserted. One of two premises based on the task "Is the local printer driver correct?" is then asserted based on what the appropriate method finds. If the drivers are installed correctly, then the only conclusion asserted from Pursuit 1 500 is "The spooler is working properly" 524.

When all pursuits have been completed, the conclusions are provided to the user. In this example, four final conclusions are asserted and returned to the user:

The spooler is not the problem.
Printer needs service:LOOSE CONNECTIONS.
Printer needs service:CHANGE TONER.
Network connection status is:INACCESSIBLE.

Of course, these conclusions are dependent upon the particular decision paths that are traversed, which, in turn, are dependent upon evaluations of premises for a user's current situation.

CONCLUSION

A compositional decision support reasoning system addresses deficiencies that are apparent in many currently existing knowledge representation paradigms. The idea of pursuits in a reasoning system allows many scenarios to be explored for a given problem. Pursuits relate to a problem, and are annotated so that they can be searched by keyword. The exploration of one pursuit does not preclude the exploration of any others.

A compositional decision support reasoning system is designed for easy and flexible authorship. The elements related to creating logic that flows in the form of an ICG graph are distinctly defined and related to one another. This not only makes authorship easy to learn, but it also simplifies the task of modifying an ICG. The ease and flexibility of authorship encourages wide authorship, and thus increases the depth of knowledge in a given decision support system. This lends to the critical balance between the simplicity of a knowledge representation that encourages wide authorship by experts, and the complexity of representation that makes the knowledge usable by a knowledge reasoning system.

A compositional decision support reasoning system is also designed for algorithmic flexibility. The decomposition of knowledge into distinctive, but not necessarily mutually exclusive, pursuits supports functions such as reentrant capabilities (as supported by contexts), or knowledge trackability (as supported by concepts).

Nodes in an ICG have been described throughout this application as being traversed. However, in some decision support systems implementing an ICG reasoning system, all nodes within a pursuit may be viewable, which may lead one to believe that any nodes which appear have already been traversed. However, it should be understood that in such systems, while nodes are viewable, a particular node is not traversed until it has been selected by a process of the decision support session, and then processed in a manner described in this application. For example, a pursuit in which all nodes are viewable may illustrate the status of a node by color. Yellow may represent a premise that is currently being evaluated, indicating that subsequent nodes cannot be traversed until the current node finishes. Furthermore, red nodes may be nodes that have failed, green nodes may be nodes that have passed, and blue nodes may indicate conclusions. As premises are evaluated and asserted or retracted, a view of the ICG is dynamically updated. This graphical representation automatically grows and lays itself out as nodes in a given pursuit are traversed during the session.

The example implementation of an ICG as described in this invention is for illustrative purposes only. It is not meant to be an exhaustive example, and should be understood that this invention has many other applications and implementations not discussed herein.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for determining one or more solutions to a problem, comprising:
 a. at least one computer readable medium; and
 b. computer readable program code stored on said at least one computer readable medium, comprising program code for traversing one of at least one path in one of at least one pursuit associated with said problem to generate one or more decision paths, said code comprising:
  i. program code for processing a given one of at least one node in said one of at least one path, comprising:
   (1) program code for evaluating a premise if said node type is a premise node, and passing said premise node if said premise passes; and
   (2) program code for noting a conclusion if said node type is a conclusion node, for withdrawing any previous conclusions that are not associated with a parent node of said conclusion, while leaving any previous conclusions that are associated with said parent node, and for passing said conclusion node;
  ii. program code for processing a child node of said given one of at least one node if said given one of at least one node is not a leaf node and is a node that passes;
  iii. program code for terminating a given one of one or more decision paths if said child node cannot be processed, comprising asserting all noted, but non-withdrawn conclusions; and
  iv. program code for generating another of one or more decision paths.

2. An apparatus as in claim 1, wherein said program code for evaluating a premise comprises code for evaluating a premise that is derived from a task-result pair, wherein the task of said task-result pair is an interrogative task.

3. An apparatus as in claim 1, wherein said program code for evaluating a conclusion comprises code for evaluating a conclusion that is derived from a task-result pair, wherein the task of said task-result pair is a declarative task.

4. An apparatus as in claim 1, wherein said program code for passing said premise node if said premise passes comprises program code for passing said premise node if one of the following occurs:
 a. said premise is setup to be evaluated as true, and actually evaluates as true; and
 b. said premise is setup to be evaluated as false and actually evaluates as false.

5. An apparatus as in claim 1, said program code for processing additionally comprising program code for initiating another pursuit if said node type is a spawn node, and passing said spawn node.

6. An apparatus as in claim 5, wherein said program code for initiating another pursuit if said node type is a spawn node comprises program code for initiating said another pursuit while said one of at least one pursuit is executing.

7. An apparatus as in claim 5, wherein said program code for initiating another pursuit if said node type is a spawn node comprises program code for temporarily suspending said one of at least one pursuit to initiate said another pursuit, and resuming said one of at least one pursuit when said another pursuit completes.

8. An apparatus as in claim 1, said program code for processing additionally comprising program code for passing a null node if said node type is a null node.

9. An apparatus as in claim 1, said program code for processing additionally comprising program code for passing an auto premise node if said node type is an auto premise node.

10. An apparatus as in claim 1, wherein said program code for traversing one of at least one path in one of at least one pursuit to generate one or more decision paths comprises program code for traversing each of said at least one path in said given one of said at least one pursuit to generate said one or more decision paths.

11. An apparatus for determining one or more solutions to a problem, comprising:
   a. means for processing a given one of at least one node in one of at least one path of a given one of at least one pursuit associated with said problem, said processing comprising:
      i. means for evaluating a premise if said node type is a premise node, and passing said premise node if said premise passes; and
      ii. means for noting a conclusion if said node type is a conclusion node, for withdrawing any previous conclusions that are not associated with a parent node of said conclusion, while leaving any previous conclusions that are associated with said parent node, and for passing said conclusion node;
   b. means for processing a child node of said given one of at least one node if said given one of at least one node is not a leaf node and is a node that passes;
   c. means for terminating a decision path if said child node cannot be processed, comprising asserting all noted, but non-withdrawn conclusions; and
   d. means for generating a second of one or more decision paths.

12. A computer-implemented method for determining one or more solutions to a problem, comprising traversing one of at least one path in one of at least one pursuit to generate one or more decision paths, said traversing comprising:
   a. processing a given one of at least one node in said one of at least one path, said processing comprising:
      i. evaluating a premise if said node type is a premise node, and passing said premise node if said premise passes; and
      ii. noting a conclusion if said node type is a conclusion node, withdrawing any previous conclusions that are not associated with a parent node of said conclusion, while leaving any previous conclusions that are associated with said parent node, and passing said conclusion node;
   b. processing a child node of said given one of at least one node if said given one of at least one node is not a leaf node and is a node that passes;
   c. terminating a decision path if said child node cannot be processed, comprising asserting all noted, but non-withdrawn conclusions as said one or more solutions to said problem; and
   d. generating another of said one or more decision paths.

13. A method as in claim 12, wherein said evaluating a premise comprises evaluating a premise that is derived from a task-result pair, wherein the task of said task-result pair is an interrogative task.

14. A method as in claim 12, wherein said passing said premise node if said premise passes comprises passing said premise node if one of the following occurs:
   a. said premise is setup to be evaluated as true, and actually evaluates as true; and
   b. said premise is setup to be evaluated as false and actually evaluates as false.

15. A method as in claim 12, wherein said evaluating a conclusion comprises evaluating a conclusion that is derived from a task-result pair, wherein the task of said task-result pair is a declarative task.

16. A method as in claim 12, said program code for processing additionally comprising program code for initiating another pursuit if said node type is a spawn node, and passing said spawn node.

17. A method as in claim 16, wherein said initiating another pursuit if said node type is a spawn node comprises initiating said another pursuit while said one of at least one pursuit is executing.

18. A method as in claim 16, wherein said initiating another pursuit if said node type is a spawn node comprises temporarily suspending said one of at least one pursuit to initiate said another pursuit, and resuming said one of at least one pursuit when said another pursuit completes.

19. A method as in claim 12, said processing additionally comprising passing a null node if said node type is a null node.

20. A method as in claim 12, said processing additionally comprising passing an auto premise node if said node type is an auto premise node.

21. A method as in claim 12, wherein said traversing at least one path in one of at least one pursuit to generate one or more decision paths comprises traversing each path in said one of at least one pursuit to generate one or more decision paths.

* * * * *